United States Patent Office 3,350,359
Patented Oct. 31, 1967

3,350,359
POLYMERIZATION OF ALDEHYDES
Sadao Yoshioka, Toyonaka-shi, Osaka-fu, Ken Noro, Amagasaki-shi, Hiroshi Kawazura, Toyonaka-shi, Osaka-fu, and Hiroshi Takita, Osaka-shi, Japan, assignors to Nippon Gosei Kagaku Kogyo Kabushiki Kaisha, Osaka, Japan
No Drawing. Continuation of application Ser. No. 283,683, May 28, 1963. This application Aug. 4, 1966, Ser. No. 570,375
Claims priority, application Japan, June 4, 1962, 37/22,334, 37/22,335
6 Claims. (Cl. 260—67)

This application is a continuation of Ser. No. 283,683, filed May 28, 1963, now abandoned.

The present invention relates to the polymerization of aldehydes, more particularly a method of polymerizing a lower aliphatic aldehyde to a solid polymer of improved properties.

It has been known that a lower aliphatic aldehyde such as formaldehyde or acetaldehyde can be polymerized catalytically to a long-chained polymer of polyacetal type.

As the catalyst employed for the polymerization of aldehydes, there are known for formaldehyde amino compounds, metal alkoxides, metal carbonyl compounds, sulphur, etc. and for acetaldehyde acids or salts determined as Lewis acid group, activated alumina, metal alkoxides, organo-metallic compounds, etc.

The polymer obtained by the polymerization of aldehydes, however, is generally not fully stable, and particularly from aldehydes other than formaldehyde there may be only obtained unstable, elastic and amorphous polymer in many cases.

It is an object of the present invention to provide a new method of polymerizing a lower aliphatic aldehyde.

A particular object of the present invention is to provide a method of producing a polymerized aldehyde of improved properties.

Another object of the present invention is to provide a group of catalysts useful for the polymerization of aldehydes.

Other objects of the present invention will be apparent from the following description and claims.

It has now been found that the above objects may be attained in accordance with the present invention by carrying out the polymerization of aldehydes in the presence of the catalyst as determined below.

Said catalyst is a member of the group consisting of the complex of a metal selected from the group consisting of alkali metals and alkaline earth metals with an organic compound having at least one of the conjugated double bond linkages, and the "living polymer" obtained by polymerizing an ethylenically unsaturated monomeric compound in the presence of said metal complex.

Said "living polymer" means an active polymer which may initiate the polymerization of any polymerizable compound.

Examples of the organic compounds employed to prepare said metal complex are aromatic hydrocarbons and the derivatives thereof such as naphthalene, anthracene, naphthacene, styrene, diphenylethylene, benzophenone, azobenzene, arsenobenzene, posphinobenzene, etc., unsaturated aliphatic hydrocarbons and the derivatives thereof such as butadiene, isoprene, etc., and heterocyclic compounds and the derivatives thereof such as pyridine, vinyl pyridine, aldehyde collidine, picoline, lutidine, collidine, quinoline, quinoxaline, acridine, pyrimidine, naphthylidine, thiophene, vinyl thiophene, furan, vinyl furan, etc. They may be easily converted to the colored metal complex by reacting with an alkali metal or an alkaline earth metal such as lithium, sodium, potassium, cesium, magnesium, calcium, strontium, barium, etc. or an alloy thereof in a suitable solvent such as tetrahydrofuran, diethyl ether, dimethoxyethane, dioxane, toluene, etc.

The thus obtained metal complexes are characterized by their remarkable color in appearance and activity to initiate the polymerization of any polymerizable compounds to form "living polymer," and they may be distinguished according to their characteristics as described above from ordinary organometallic compounds being known hitherto as catalyst for polymerization of aldehydes.

The metal complexes employed in the present invention have never been known as catalyst for the polymerization of aldehydes but known only as catalyst for the polymerization of vinyl compounds such as styrene.

In carrying out the method of the present invention, a purified anhydrous aldehyde is subjected to come in contact with the metal complex prepared as described above in a suitable solvent such as tetrahydrofuran, diethyl ether, dimethoxyethane, dioxane, toluene, etc. The process of the preparation of the metal complex and the polymerization thereby should be carried out under extremely reduced pressure or in the atmosphere of an inert gas such as nitrogen and in the absence of oxygen, carbon dioxide, water or alcohols, as they may affect the metal complex to decolor and lose its activity for catalyst. In most cases, the polymerization may be preferably carried out at a temperature of less than a room temperature, desirably less than about —40° C. The resulted polymer is separated as precipitate from mother liquor, and washed with water or an alcohol such as methanol to remove the residue of catalyst.

The method of the present invention may also be carried out as follows; in the first stage an ethylenically unsaturated monomeric compound such as styrene, acrylic esters, methacrylic esthers, vinyl esters, vinylpridine, butadiene, etc. is subjected to come in contact with the metal complex prepared in the same way as described above to prepare the "living polymer" of said monomeric compound, and in the second stage a purified anhydrous aldehyde is charged into the solution of said "living polymer." The thus obtained polymer may probably be the block copolymer in which the polymer of an aldehyde is combined with said living polymer.

In any case the obtained polymer of an aldehyde may be, if desired, stabilized according to any known methods by which the terminal —OH group of the polymer may be acylated or etherified. The stabilization of the polymer prepared by the method of the present invention may be successfully carried out in more moderate conditions than that in the stabilization process for the polymer prepared by any ordinary method, by treating the polymer prepared by the method of the present invention with an acylating agent such as acetic anhydride, ketene, etc. or an etherifying agent such as alcohols, alkylene oxides, alkyl halides, dialkyl sulfates, etc. before the polymer is separated from the polymerization system and there is lost the activity of the terminal group of the polymer.

The method of the present invention may be successfully applicable for the polymerization of any lower aliphatic aldehydes having carbon atoms of 1 to 8 or more, particularly 1 to 4. Their examples are formaldehyde, acetaldehyde, propionaldehyde, butyraldehyde, isobutyraldehyde, valeraldehyde, isovaleraldehyde, hexanal, methoxybutyraldehyde, ethoxybutyraldehyde, chloroacetaldehyde, chloral, etc.

According to the present invention, there may be produced solid polymer of a lower aliphatic aldehyde, which may be characterized by its increased crystallinity and high polymerization degree and may be useful for various applications.

Another important feature of the present invention is the remarkable imporved stability of the resulting polymer in the case wherein the living polymer is employed as catalyst. In that case, furthermore, there may be obtained the polymer of properties varied in a wide range in accordance with various requirements, by varying quantity or polymerization degree of the living polymer employed as catalyst or the kind of monomer from which said living polymer is prepared.

The present invention is illustrated in detail by the following examples in which parts and percentages specified are by weight.

EXAMPLE 1

*Preparation of catalyst*

Into a closed vessel of hard glass 2 parts of purified metallic potassium were charged. The vessel was kept at a reduced pressure of about $10^{-4}$ mm. Hg and said metallic potassium was heated to form the thin film of metal on the inside wall of the vessel, and then 1 part of naphthalene and 100 parts of tetrahydrofuran were charged into the vessel at a room temperature. After unchanged metal was filtered off, the dark green solution of naphthalene-potassium complex was obtained.

*Polymerization of formaldehyde*

Into 1 part of the thus prepared solution of the complex, 1 part of purified formaldehyde free from trace of water was slowly added at a temperature of $-78$ C. and a pressure of $10^{-4}$ mm. Hg. By the addition of formaldehyde, the solution became gradually milky and was decolored. After the formed precipitate was separated from mother liquor, washed with methanol and dried, polymer of white powder was obtained with the quantitative yield to the charged formaldehyde.

By the means of ultrared absorption spectrum, it was determined that the obtained polymer was highly polymerized polyoxymethylene. Said polymer is insoluble to ordinary solvents other than dimethylformamide and p-chlorophenol. It has softening point of 184° C. and decomposes gradually at a temperature of about 230° C. or more.

EXAMPLES 2 to 4

In each cases, the procedure of Example 1 was repeated with the exception that anthracene-sodium complex, pyridine-sodium complex or benzophenone-di-potassium complex were employed as catalyst in place of naphthalene-potassium results to that in Example 1 in any case.

EXAMPLE 5

*Preparation of catalyst*

The procedure of Example 1 for the preparation of catalyst was repeated with the exception that 1 part of styrene and 2 parts of metallic sodium were employed in place of naphthalene and potassium, respectively. There was obtained the red solution of the living polystyrene of about 150 on polymerization degree.

*Polymerization of formaldehyde*

Into 1 part of said solution of the living polystyrene, 0.8 part of purified formaldehyde were added at a temperature of $-78°$ C. and a pressure of $10^{-4}$ mm. Hg to obtain the block copolymer consisting of polyoxymethylene and polystyrene. The polymer is only soluble at an elevated temperated to any of dimethylformamide and p-chlorophenol. It has softening point of 180° C. and may be kept stable even at a temperature of about 200° C. or more.

EXAMPLE 6

Into 1 part of the solution of the living polystyrene of about 20,000 on polymerization degree prepared in the same way as described in Example 5, 0.2 part of purified formaldehyde were added at a temperature of $-50°$ C. and in the atmosphere of nitrogen to obtain a polymer having softening point of 174° C. The polymer is soluble to any of dimethylformamide, p-chlorophenol and toluene, and is stable at a temperature of about 200° C. or more.

EXAMPLE 7

Into 1 part of the solution of naphthalene-potassium complex prepared in the same way described in Example 1, 0.1 part of styrene were added at a temperature of $-78°$ C. and under an atmosphere of nitrogen to obtain living polystyrene and then 0.8 part of formaldehyde were added. The similar polymer to that resulted in Example 5 was obtained.

EXAMPLE 8

The solution of naphthalene-potassium complex was prepared in the same way described in Example 1 with the exception that 1 part of metallic potassium and 12 parts of tetrahydrofuran were employed in place of 2 parts and 100 parts, respectively. Into 1 part of the thus prepared solution 8 parts of purified and water-free acetaldehyde and 18 parts of toluene were added at a temperature of $-78°$ C. and a pressure of $10^{-4}$ mm. Hg. After about 8 hours, white solid of the polymer of acetaldehyde was obtained with the yield of about 40% to the charged acetaldehyde.

By means of X-ray and ultrared absorption spectrum, it was determined that the thus obtained polymer was characterized by its remarkably increased crystallinity. The polymer is not soluble to any of ordinary solvents but only somewhat soluble to chloroform. It may decompose gradually at the rate of about 1% per hour at 30° C. and rapidly at 100° C.

EXAMPLES 9 to 12

In each case, the procedure of Example 8 was repeated with the exception that naphthalene-lithium complex, anthracene-sodium complex, pyridine-sodium complex or benzophenone-di-potassium complex were employed as catalyst, respectively. The similar results to that obtained in Example 8 were obtained in any case.

EXAMPLE 13

The solution of living polystyrene of about 20,000 on polymerization degree was prepared in the same way described in Example 5 with the exception that 1 part of sodium and 12 parts of tetrahydrofuran were employed in place of 2 parts and 100 parts, respectively. Into 1 part of the obtained solution, 8 parts of acetaldehyde and 18 parts of n-hexane were added at a temperature of $-100°$ C. and a pressure of $10^{-4}$ mm. Hg. After about 7 hours, white solid of block copolymer of styrene and acetaldehyde was obtained. The polymer is soluble to chloroform and toluene. It may decompose at the rate of only about 0.1% per hour at 30° C., at the rate of about 20% per hour at 100° C. and rapidly at about 200° C. or more. After it is acetylized with acetic anhydride, the decomposition rate may be about 5% per hour at 100° C.

EXAMPLES 14 to 18

In each case, the procedure of Example 13 was repeated with the exception that methyl vinyl-pyridine, α-methyl styrene, methyl methacrylate, isoprene or butadiene were employed to prepare the living polymer in place of styrene, respectively. The similar results to that obtained in Example 13 were obtained in any case.

EXAMPLE 19

Into a vessel kept at an extremely reduced pressure, magnesium-amalgam prepared from 0.6 part of magnesium and 50 parts of mercury, 5 parts of benzophenone and 200 parts of tetrahydrofuran were charged at a room temperature. After standing for a night, the dark blue solution of magnesium-benzophenone complex was obtained.

There were charged 1 part of acetaldehyde and 2 parts of toluene into 1 part of said solution of the complex at a temperature of −78° C. and a pressure of 10⁻⁴ mm. Hg. After about 24 hours, the polymer of acetaldehyde was obtained with the yield of 64% to charged acetaldehyde.

EXAMPLES 20 to 21

In each case, the procedure of Example 19 was repeated with the exception that 4.5 parts of strontium or 7 parts of barium were employed to prepare the complex with benzophenone in place of magnesium-amalgam, respectively. The similar results to that in Example 19 were obtained in any case.

What is claimed is:
1. A polymerization process for polymerizing an aliphatic aldehyde having less than 9 carbon atoms which comprises essentially the steps of:
   (a) reacting a metal selected from the group consisting of an alkali metal and an alkaline earth metal with an organic compound selected from the group consisting of pyridine, collidine, aldehyde collidine, picoline, lutidine, vinyl pyridine, methyl vinyl pyridine, styrene, methyl styrene, benzophenone, butadiene and isoprene, in an inert organic solvent to form a metal complex; and then
   (b) contacting said metal complex with said aliphatic aldehyde for causing polymerization thereof.
2. A process according to claim 1, wherein said aliphatic aldehyde is formaldehyde.
3. A process according to claim 1, wherein said aliphatic aldehyde is acetaldehyde.
4. A process according to claim 1, wherein said metal is selected from the group consisting of lithium, sodium, potassium, cesium, magnesium, calcium, strontium and barium.
5. A process according to claim 1, wherein the reaction is carried out under anhydrous conditions in an inert atmosphere.
6. A process according to claim 1, wherein the reaction is initially carried out at a temperature below −40° C.

References Cited

UNITED STATES PATENTS

| | | | |
|---|---|---|---|
| 2,848,437 | 8/1958 | Langsdorf et al. | 260—67 |
| 3,116,307 | 12/1963 | Leavitt et al. | 260—665 |
| 3,216,972 | 11/1965 | Sidi | 260—67 |
| 3,225,121 | 12/1965 | Baker | 260—874 |

FOREIGN PATENTS

| | | |
|---|---|---|
| 876,956 | 9/1961 | Great Britain. |
| 870,775 | 6/1961 | Great Britain. |
| 582,945 | 9/1959 | Canada. |
| 1,302,017 | 7/1962 | France. |

Scott et al., Ind. Eng. Chem. 32, 1940) pp. 312–315.
Wenger, Chem. & Ind., 1959, 1094.
Gaylord et al., Linear and Stereoregular Addition Polymers, Interscience, 1959, pp. 464–466.
Hohr et al., Die Makromolekulare Chemi., 52, Apr. 18, 1962, pp. 59–69.
Hackh's Chemical Dictionary, McGraw-Hill Book Co., Inc. N.Y. Third Edition p. 638, 1944.

SAMUEL H. BLECH, *Primary Examiner.*

WILLIAM H. SHORT, *Examiner.*

L. M. PHYNES, *Assistant Examiner.*